W. E. HART.
SIGNAL CONTROL.
APPLICATION FILED OCT. 18, 1920.
1,389,138.
Patented Aug. 30, 1921.
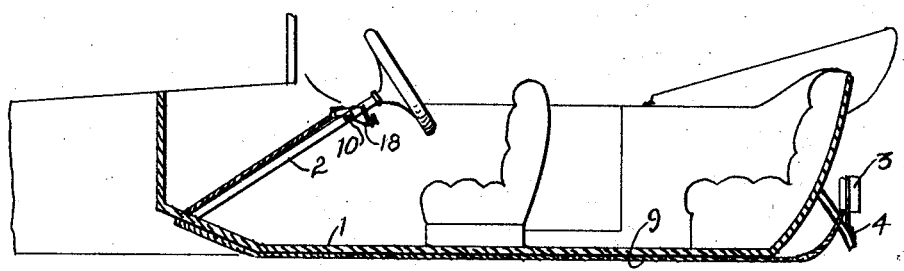
FIGURE 1
FIGURE 2
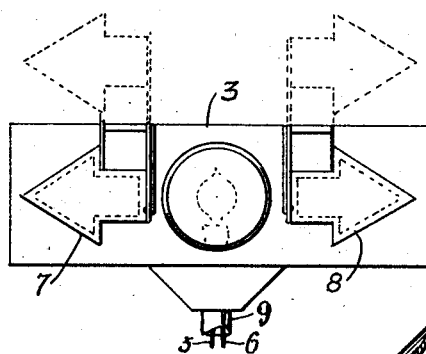
FIGURE 3
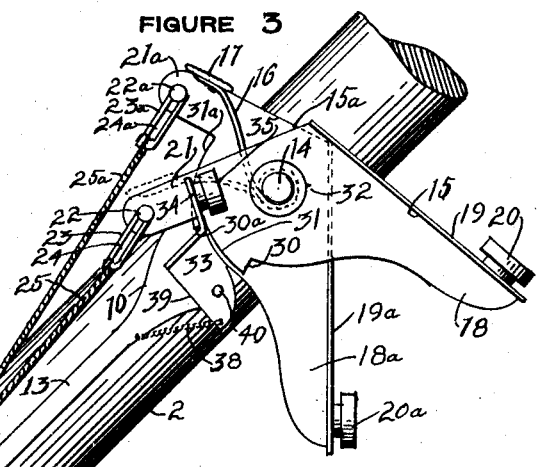
FIGURE 5
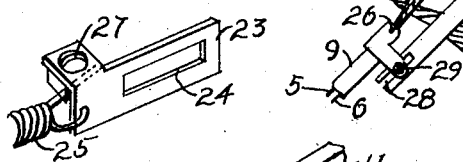
FIGURE 4
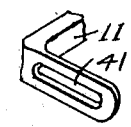
FIGURE 8
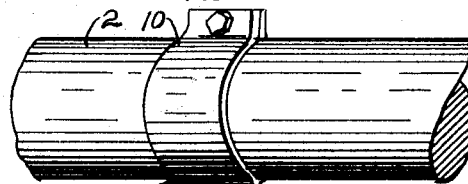
FIGURE 6
FIGURE 7
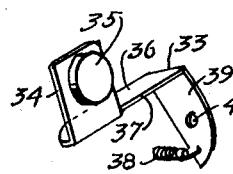
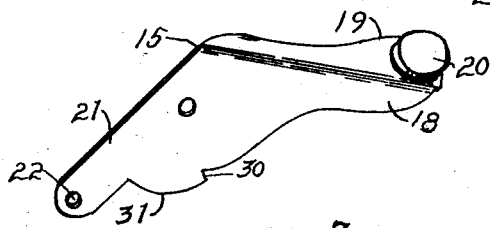
INVENTOR
William E. Hart
John A. Naismith
BY
ATTORNEY

UNITED STATES PATENT OFFICE.

WILLIAM E. HART, OF SAN JOSE, CALIFORNIA, ASSIGNOR TO HART'S AUTO SIGNAL TAIL LIGHT CO., OF SAN JOSE, CALIFORNIA, A CORPORATION.

SIGNAL CONTROL.

1,389,138. Specification of Letters Patent. Patented Aug. 30, 1921.

Application filed October 18, 1920. Serial No. 417,816.

*To all whom it may concern:*

Be it known that I, WILLIAM E. HART, a citizen of the United States, and resident of San Jose, in the county of Santa Clara and State of California, have invented certain new and useful Improvements in Signal Controls, of which the following is a specification.

My invention relates particularly to means for operating an automobile signal of the type described in my Patent No. 1,315,185 of September 2, 1919.

It is the object of my invention to provide a simple and positively acting mechanism of the nature indicated wherein desired signals may be exhibited individually or collectively at the will of the operator, and in which the operating and release mechanisms may be readily attached to the steering column of an automobile. A further object is to provide a mechanism of the character indicated provided with a signal arranged to automatically indicate when one or more of the direction signals is in an operative position.

In the drawing:

Figure 1 is a longitudinal section through a portion of an automobile body showing my invention in position.

Fig. 2 is an enlarged front elevation of the signal device operated by the control embodying my invention.

Fig. 3 is a side elevation of the control embodying my invention.

Fig. 4 is a plan view of the same.

Fig. 5 is a perspective view of one of the connecting members used in assembling certain parts of my invention.

Fig. 6 is a perspective view of the release lever.

Fig. 7 is a perspective view of one of the two operating levers.

Fig. 8 is a perspective view of a portion of the main supporting arm.

Referring more particularly to the drawing, 1 indicates the automobile body, 2 the steering column thereon, 3 the signal mounted on rear fender 4, and 5 and 6 the two wires operating the two shutters 7 and 8, the wires 5 and 6 passing forwardly of the automobile body to the upper portion of the steering column through a conduit 9.

In effecting my invention I provide a bracket 10 secured to steering column 2 in any suitable position, the said bracket having arms 11—12—13. Mounted upon arm 11 by means of bolt 14 are a pair of operating levers as 15—15$^a$ having a wire 16 mounted on bolt 14 between them and carrying a disk 17 resting upon the upper edges of levers 15—15$^a$ and at their forward ends as shown.

The operating parts of this control used in connection with each shutter are exactly alike, therefore but one mechanism will be described in detail and the other indicated by similar numerals followed by an appropriate letter.

The lever 15 has a rearwardly and downwardly extending arm 18 provided with a flange 19 upon which is mounted a button 20, and a forwardly and downwardly extending arm 21 provided with a pin 22. On pin 22 is a coupling 23 provided with slot 24 and having a coiled spring 25 attached thereto, the other end of spring 25 being attached to conduit 9 as shown at 26. One wire, as 5, passes through spring 25 and is attached to coupling 23 by bolt and nut 27. The end of arm 13 is forked as at 28 to receive bolt 29 on conduit 9.

The under edge of lever 15 has a notch 30 formed therein, the portion of said edge extending upwardly from said notch to arm 21 being curved as at 31 and preferably struck from a center eccentric to bolt 14 as at 32. By forming both edges 31—31$^a$ in this manner either lever 15 or 15$^a$ may be operated independently of the other to engage latch 33 since the notch in the lever operated will be thrown out beyond the edge of the lever not operated as shown clearly in Fig. 3.

The latch or catch 33 has an upwardly extending portion 34 provided with a button 35, a part 36 extending inwardly toward the steering column 2 and having its upper edge 37 held in engagement with the edges 31—31$^a$ of levers 15—15$^a$ by a spring 38 connected to arm 13 on bracket 10 and a depending arm 39 on catch 33, the latter arm being pivotally mounted at 40 on arm 12 on bracket 10.

In operation, if it is desired to raise shutter 7 (turn left) lever 15 is pressed downwardly until notch 30 engages edge 37 on latch 33. This operation pulls wire 5 to operate the shutter 7 and extends springs 25. Also, since disk 17 rests upon both levers 15—15ª and is pivoted on bolt 14 by wire 16, the said disk is raised into the position shown in Fig. 3. If this disk is painted red or otherwise made conspicuous it acts as a reminder that a signal is showing. A slight pressure on button 35 throws catch 33 out of engagement with notch 30 in lever 15 and the spring 25 returns the lever to a normal position. The same action takes place if lever 15ª is operated to throw shutter 8 (turn right), or if both levers 15—15ª are operated at the same time to throw both shutters 7—8 (stop). In either case the operation of catch 33 immediately returns the several parts to their normal positions.

In this construction the arm 11 has a slot 41 formed therein so that by moving bolt 14 therein the leverage of arms 21—21ª may be increased or diminished as desired. The adjustment at 28—29 permits adjustment of spring 25 after the parts are all set. The slot 24 allows coupling 23 to slide on pin 22 thereby permitting the proper attachment of wire 5.

It is to be understood, of course, that changes in form, size, proportion, construction and method of operation may be made within the scope of the appended claims.

I claim:

1. An actuating mechanism comprising a pair of operating elements, a support for said elements, a pair of levers to which said elements are attached, a common shaft therefor, a resilient connection between each lever and said support, a releasable catch operatively mounted with relation to said levers, and means for effecting the engagement of each lever with said catch when thrown into an operative position.

2. An actuating mechanism comprising a pair of operating elements, a pair of levers to which said elements are attached, a common shaft therefor, a support for said elements adjustably mounted with relation to said levers and spaced a distance therefrom, a resilient connection between each lever and said support, a releasable catch operatively mounted with relation to said levers, and means for effecting the engagement of each lever with said catch when thrown into an operative position.

3. An actuating mechanism comprising a pair of operating elements, a support for said elements, a pair of levers to which said elements are attached, a common shaft for said levers, a coupling slidably mounted on each lever, a resilient connection between each coupling and said support, a releasable catch operatively mounted with relation to said levers, and means for effecting the engagement of each lever with said catch when thrown into an operative position.

4. An actuating mechanism comprising a pair of operating elements, a pair of levers to which said elements are attached, a common shaft therefor, a support for said elements adjustably mounted with relation to said levers and spaced a distance therefrom, a coupling slidably mounted on each lever, a resilient connection between each coupling and said support, a releasable catch operatively mounted with relation to said levers, and means for effecting the engagement of each lever with said catch when thrown into an operative position.

5. An actuating mechanism comprising a pair of operating elements, a supporting shaft, a pair of levers adjustably mounted thereon and to which said elements are attached, a support for said elements, a resilient connection between each lever and said support, a releasable catch operatively mounted with relation to said levers, and means for effecting the engagement of each lever with said catch when thrown into an operative position.

6. An actuating mechanism comprising a pair of operating elements, a supporting shaft, a pair of levers adjustably mounted thereon and to which said elements are attached, a support for said elements adjustably mounted with relation to said levers and spaced a distance therefrom, a resilient connection between each lever and said support, a releasable catch operatively mounted with relation to said levers, and means for effecting the engagement of each lever with said catch when thrown into an operative position.

7. An actuating mechanism comprising a pair of operating elements, a pair of levers operatively mounted to actuate the same, and an indicating element coaxially mounted with relation to said levers and resting thereon whereby to be moved into a clearly visible position by the operation of either lever and into a less visible position by the return of said lever and into a less visible position by the return of said lever to an inoperative position.

8. An actuating mechanism comprising a pair of operating elements, a support for said elements, a pair of levers to which said elements are attached, a common shaft therefor, a resilient connection between each lever and said support, a releasable catch operatively mounted with relation to said levers, and means for effecting the engagement of each lever with said catch when thrown into an operative position, and an indicator element revolubly mounted on said shaft and supported by the upwardly movable portions of said levers.

9. An actuating mechanism comprising a pair of operating elements, a supporting shaft, a pair of levers adjustably mounted thereon and to which said elements are attached, each lever having a notch formed in its lower edge, a support for said elements, a resilient connection between each lever and said support, a bracket supporting said shaft, a catch pivotally mounted thereon to engage said notches in said levers when thrown into an operative position, and a resilient connection between said catch and said bracket to hold said catch in an operative position with relation to said levers.

WILLIAM E. HART.